United States Patent
Duke et al.

(10) Patent No.: US 6,272,633 B1
(45) Date of Patent: Aug. 7, 2001

(54) METHODS AND APPARATUS FOR TRANSMITTING, RECEIVING, AND PROCESSING SECURE VOICE OVER INTERNET PROTOCOL

(75) Inventors: Andrew Cameron Duke, Franklin; Robert Michael Giramma, Medway; Ryan Charles Tomasetti, Marlborough, all of MA (US)

(73) Assignee: General Dynamics Government Systems Corporation, Taunton, MA (US)

( * ) Notice: Subject to any disclaimer, the term of this patent is extended or adjusted under 35 U.S.C. 154(b) by 0 days.

(21) Appl. No.: 09/291,590

(22) Filed: Apr. 14, 1999

(51) Int. Cl.[7] .................................................. H04L 9/00
(52) U.S. Cl. ........................ 713/171; 713/152; 380/217; 380/269; 380/276; 380/275
(58) Field of Search ..................................... 713/152, 171, 713/151, 160; 380/217, 269, 276, 210, 216, 275

(56) References Cited

U.S. PATENT DOCUMENTS

| | | | |
|---|---|---|---|
| 5,526,353 | * | 6/1996 | Henley et al. ................... 370/60.1 |
| 5,553,063 | * | 9/1996 | Dickson .............................. 370/29 |
| 5,799,088 | * | 8/1998 | Raike ................................... 380/30 |
| 5,883,891 | * | 3/1999 | Williams et al. .................. 370/356 |
| 5,974,142 | * | 10/1999 | Heer et al. ............................ 380/9 |

OTHER PUBLICATIONS

PGPfone—Owner's Manual (Philip R. Zimmermann, Jul. 28, 1996, www.pgpi.org/products/nai/pgpfone).*
Department of Defense Voice Processor Consortium Homepage (Sep. 14, 1998, www.plh.af.mil/ddvpc/index.html).*
"Department of Defense Voice Processor Consortium Homepage," Website at http:/www.plh.af.mil/ddvpc/index.html (Sep. 14, 1998).

* cited by examiner

Primary Examiner—Tod Swann
Assistant Examiner—Paul E. Callahan
(74) Attorney, Agent, or Firm—Jenner & Block, LLC

(57) ABSTRACT

This disclosure describes systems and methods for processing voice data for secure transmission and secure receipt over a network, such as the Internet. The systems and methods include the processing of analog voice and digital information, including conversion of a voice signal into digital information (or of digital information into a voice signal) and transmission of digital information representing voice data over a network. The analog-to-digital conversion (and digital-to-analog conversion) includes coding and decoding digital information according to voice coding techniques and encrypting and decrypting digital information according to encryption techniques. The transmission of the digital information includes creation of a secure voice frame.

14 Claims, 6 Drawing Sheets

METHODS AND APPARATUS FOR TRANSMITTING, RECEIVING, AND PROCESSING SECURE VOICE OVER INTERNET PROTOCOL

BACKGROUND OF THE INVENTION

A. Field of the Invention

The present invention relates to a method and apparatus for processing voice data for transmission and receipt over a network. More particularly, the invention relates to methods and apparatus for processing of secure voice communications for transmission and receipt over a network.

B. Description of the Related Art

The advent of digital networks has expanded the possibilities for the exchange of information. In particular, the speed of communications over these networks has developed dramatically. Most recently, the speed of digital networks has almost doubled every three years. Due to the new capabilities resulting from the improvements in speed, the transmission not only of data but also of voice and multimedia has become feasible. However, the security for these types of communications has not matched the improvements in speed.

Indeed, with the technological sophistication of digital networks, many users have begun to utilize digital networks for voice communications. Of course, as with any form of voice communications, confidentiality is a primary concern. Specifically, because voice communications entail important commercial and governmental information, there is an obvious need for confidentiality and security. In addition, the need for secure voice communications will also include communications over a wire line as well as communications over digital networks. Moreover, as digital networks are used more and more for multimedia applications, the same concerns of confidentiality and security will become relevant outside of the confines of voice communications.

With conventional systems and methods for secure voice communications over wire lines, there are a limited number of types of secure telephone equipment, such as secure telephone unit, 3rd generation (STU-III) equipment and secure terminal equipment (STE). However, STU-III uses obsolete synchronous analog techniques, and STE requires an ISDN connection. For these reasons, these systems are generally considered inadequate for secure voice communications.

With the present systems and methods for secure communications over digital networks, such as, for example, the Internet, neither STU-III nor STE is compatible with Internet-based networks. In fact, the only known means of transmitting and receiving secure voice communications using an Internet protocol is the PGP-Fone. The PGP-Fone is distributed over the Internet and utilizes the PRETTY GOOD PRIVACY (PGP) encryption technique. However, the PGP-Fone does not support narrowband and similar bandwidth-limited connections. In addition, the PGP-Fone is incompatible with government-standardized voice coding and cryptographic techniques, such as mixed excitation linear prediction (MELP) for voice coding and SKIPJACK for encryption. As a result, the PGP-Fone does not entail the technical sophistication necessary for adequate secure voice communications over a digital network, such as the Internet.

Due to the absence of a system or method of transmitting, receiving, and processing voice data in a secure manner over the Internet, there is a general need for such a system and method. In addition, there is also a need for such a secure system and method for the highly important voice communications of business and government, including those that require an Internet connection.

SUMMARY OF THE INVENTION

Methods and apparatus consistent with the present invention overcome the shortcomings of the conventional systems by processing secure voice for transmission and receipt over a network.

In accordance with the purposes of the invention, as embodied and broadly described herein, one aspect of the invention includes a method consistent with the present invention of transmitting sound. This method comprises receiving an analog signal representing sound, converting the analog signal into digital information, translating the digital information into a data frame using a linear prediction technique, encrypting the data frame into a ciphertext frame, forming a secure voice frame from the ciphertext frame, and transmitting the secure voice frame.

In another aspect, the invention includes a method for receiving sound, comprising the steps of receiving a secure voice frame, removing a header from the secure voice frame to obtain a ciphertext frame, decrypting the ciphertext frame into a data frame, translating the data frame into digital information using a linear prediction technique, converting the digital information into an analog signal representing sound, and outputting the sound.

In yet another aspect, the invention includes a method for transmitting and receiving speech, comprising the steps of receiving an analog signal representing speech, converting the analog signal into digital information, translating the digital information into a data frame using a linear prediction technique, storing the data frame in a first transmitter buffer, encrypting the data frame into a ciphertext frame using a codebook encryption algorithm, storing the ciphertext frame in a second transmitter buffer, forming a secure voice frame from the ciphertext frame, transmitting the secure voice frame over a network, receiving the secure voice frame over a network, removing the header from the secure voice frame to obtain the ciphertext frame, storing the ciphertext frame in a first receiver buffer, decrypting the ciphertext frame into a data frame using a codebook decryption algorithm, storing the data frame in a second receiver buffer, translating the data frame into digital information using a linear prediction technique, converting the digital information into an analog signal representing speech, and outputting the speech.

Additional aspects of the invention are disclosed and defined by the appended claims. It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, or incorporated in and constitute a part of this specification, illustrate preferred embodiments of the invention, and, together with the description, serve to explain the principles of the invention.

In the drawings.

DETAILED DESCRIPTION

A. Introduction

A system consistent with the principles of the present invention as disclosed herein provides for processing secure voice communications for transmission and receipt over a network. The methodology used by the disclosed system conforms to standards for voice coding and cryptography. Accordingly, the system avoids the shortcomings of the present systems and methodologies, which are incompatible with government-standardized voice coding and cryptographic techniques. For example, for voice coding, the system utilizes mixed excitation linear prediction (MELP), although other coding techniques may be used, such as, for example, code excited linear prediction (CELP). Furthermore, for cryptography, the system utilizes SKIPJACK, which is a standard, but again, other encryption schemes may be used, such as, for example, the Government Type 1 requirements known to those skilled in the art. With the disclosed system, and as otherwise described herein, the transmission and receipt of secure voice communications over a network is made possible. Further, with the disclosed system, secure voice communications may occur over narrowband and other bandwidth-limited connections. This capability ensures compatibility with future narrowband digital terminal (FNBDT) equipment, including CONDOR equipment. Moreover, the system is also compatible with both wireline and wireless networks. Accordingly, due to this scope of compatibility, the system is much less expensive than current systems and methods for secure voice communications.

B. System

Figure 1:
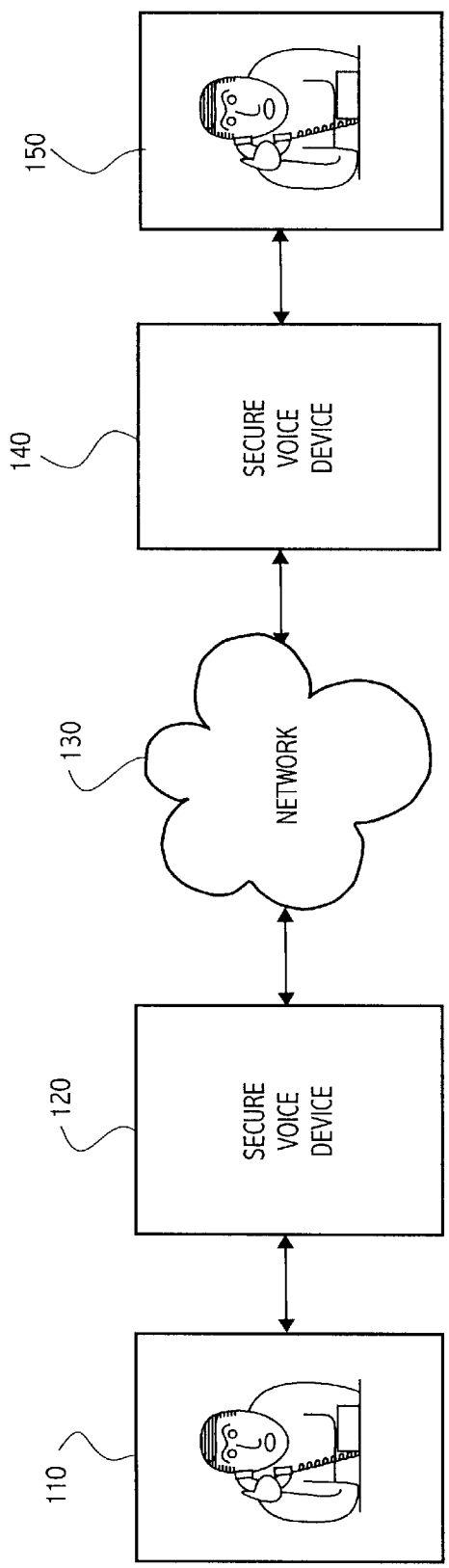
FIG. 1 is a block diagram of a secure voice over Internet protocol system consistent with the principles of the present invention.

FIG. 1 illustrates a block diagram of a secure voice over Internet protocol system according to the present invention. System 100 comprises a voice source 110, a secure voice device 120, a network 130, such as, for example, the Internet, a secure voice device 140, and a voice destination 150. Voice source 110 and voice destination 150 may both serve as the source and destination of a voice input or voice output. Secure voice device 120 and secure voice device 140 similarly process voice information for transmission and receipt via network 130. Accordingly, secure voice 120 and secure voice 140 contain both a secure voice encoder and secure voice decoder. Notably, although the description of the present invention encompasses voice communications, systems consistent with the invention may also operate with data or other objects over any form of network. Indeed, one likely alternative use of the present invention is for multimedia.

Figure 2:
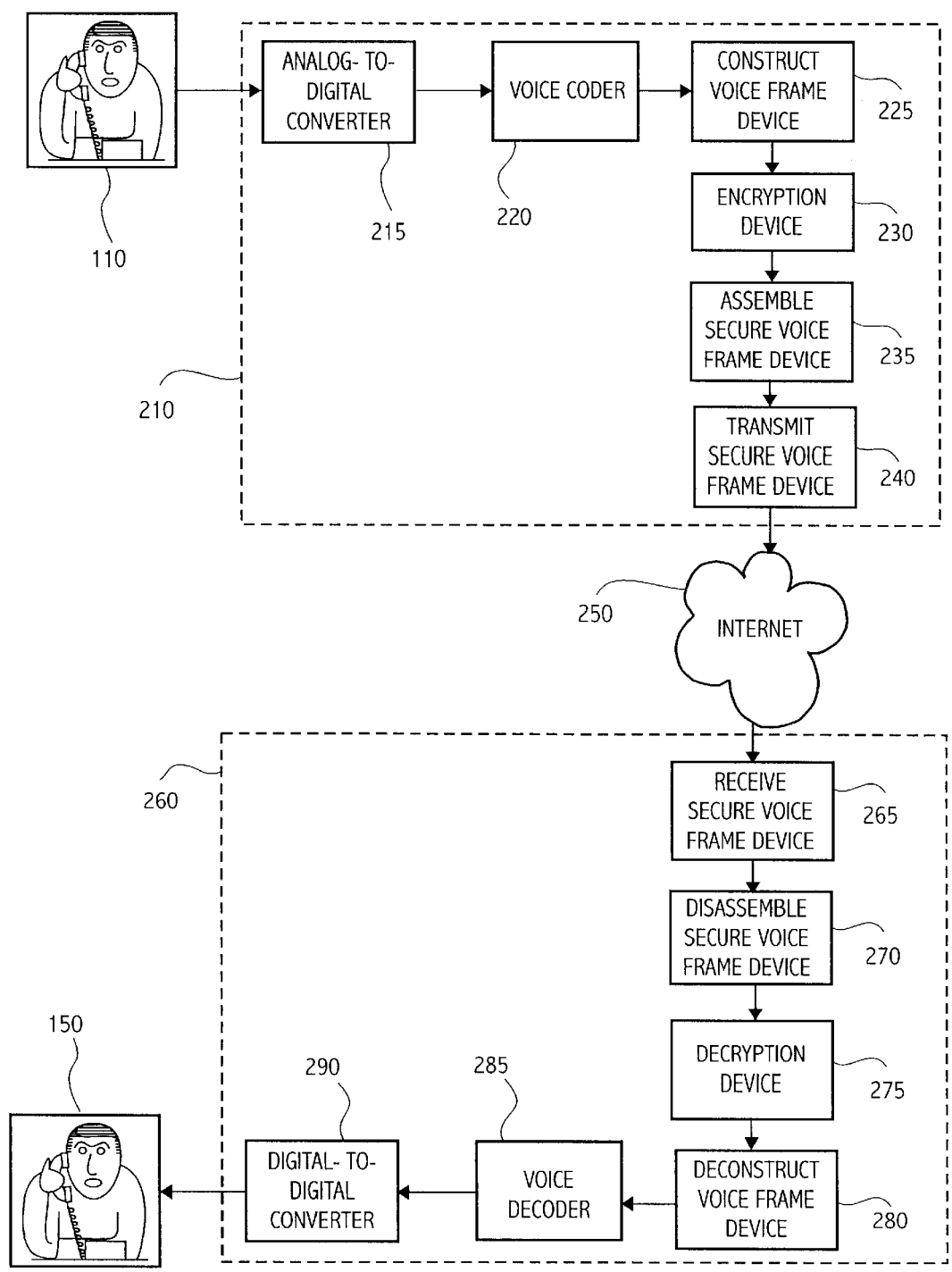
FIG. 2 is a block diagram of a secure voice over Internet protocol encoder system and a secure voice over Internet protocol decoder system in accordance with one embodiment of the present invention.

FIG. 2 illustrates a block diagram of a secure voice over Internet protocol encoder system and a secure voice over Internet protocol decoder system, in accordance with one embodiment of the present invention. In this embodiment, encoder/decoder system 200 comprises voice source 110, encoder 210, Internet 250, decoder 260, and voice destination 150. Encoder 210 comprises analog-to-digital converter 215, voice coder 220, construct voice frame device 225, encryption device 230, assemble secure voice frame device 235, and transmit secure voice frame device 240. Decoder 260 includes receive secure voice frame device 265, disassemble secure voice frame device 270, decryption device 275, deconstruct voice frame device 280, voice decoder 285, and digital-to-analog converter 290. Notably, both encoder 210 and decoder 260 comprise the same basic components. Thus, either encoder 210, decoder 260, or both, may be implemented at any standard terminal, such as, for example, a Windows-based personal computer.

As shown in FIG. 2, voice source 110 provides a voice input for encoder 210. Encoder 210 then processes the voice input to create a secure voice frame for transmission over Internet 250. In one embodiment, encoder 210 may negotiate a session key before processing the voice input for transmission. A session key allows the participating devices to communicate using a specified type of encryption. In one implementation of this embodiment, encoder 210 contains pre-placed keys, such as, for example, pre-placed SKIPJACK keys. In another implementation of this embodiment, the negotiation of the session key may include the use of the key exchange algorithm (KEA). KEA is a 1024-bit key exchange algorithm. Of course, other implementations of this embodiment may also be used to negotiate the session key.

As also shown in FIG. 2, once encoder 210 receives the voice input, analog-to-digital converter 215 converts the voice information from an analog signal to digital information. Next, voice coder 220 compresses the digital information according to a compression technique. In one embodiment, voice coder 220 utilizes mixed excitation linear prediction (MELP) as the compression technique. MELP is a standard compression technique. Other standard compression techniques may also be used, such as the code excited linear prediction (CELP) technique. Essentially, any compression technique used for voice or data would represent a valid coding substitute. In one implementation, voice coder 220 is a digital signal processor (DSP) with MELP software. However, a DSP is not necessary. In another implementation, voice coder 220 is entirely software. In such a software implementation, voice coding could be entirely performed by a standard personal computer. Indeed, in a personal computer, a standard sound card (such as, for example, a Sound Blaster™ card) could even be used to facilitate voice coding.

After voice coder 220, encoder 210 transfers the compressed digital information from voice coder 220 to construct voice frame device 225. Construct voice frame device 225 assembles the compressed digital information into a voice frame. Next, encoder 210 encrypts the voice frame, using encryption device 230. In one embodiment, encryption device 230 may include either a hardware implementation or a software implementation. A hardware implementation may include, for example, a commercially available Fortezza PC card. A software implementation may include, for example, a software program such as, for example, Spyrus Software Fortezza. One example of such a software routine is SKIPJACK. SKIPJACK is an 80-bit encryption algorithm that is not extensible to higher key lengths. Notably, in a software implementation, encryption could be performed by a standard personal computer.

Encryption device 230 changes the voice frame to a ciphertext frame by the addition of a ciphertext header. Once the ciphertext voice frame is created, encoder 210 then assembles a secure voice frame in assemble secure voice frame device 235. In one embodiment, encoder 210 assembles a secure voice frame by adding a sequence number and frame check sequence to the ciphertext voice frame obtained from encryption device 230. Finally, encoder 210 transmits the secure voice frame according to transmit secure voice frame device 240 over Internet 250. In one embodiment, transmit secure voice frame device 240 prepares the secure voice frame for transmission by adding padding to the secure voice frame obtained from secure voice frame device 240. Padding is the addition of one or more additional bits to the secure voice frame. In one implementation, the secure voice frame is then transmitted via user datagram protocol, Internet protocol (UDP/IP), which is a connectionless, best-effort communications method for exchanging messages between computers in a network. UDP is a connectionless protocol, as contrasted with the TCP/IP protocol. UDP/IP is an advantageous transmission protocol because IP datagrams can take different paths through the network. The use of UDP/IP is also advantageous because the protocol may be implemented for use with FNBDT equipment.

After encoder 210 constructs the secure voice frame, and after transmit secure voice frame device 240 prepares the secure voice frame for transmission, encoder 210 transmits the secure voice frame over Internet 250. Decoder 260 receives the secure voice frame from encoder 210 via Internet 250. Decoder 260 then utilizes a decoding process similar to the encoding process utilized by encoder 210 to translate the secure voice frame to a voice output. Decoder 260 receives the secure voice frame at receive secure voice frame device 265. If encoder 210 transmits the secure voice frame using UDP/IP, decoder 260 also utilizes UDP/IP to receive the secure voice frame at secure voice frame device 265. Notably, if UDP/IP is used, a static or dynamic jitter buffer is utilized at secure voice frame device 265 to allow for each secure voice frame to be rearranged upon receipt, in order to account for any transit and buffering delays in the network. This is necessary due to the nature of UDP/IP. Of course, other implementations may use other protocols, and a jitter buffer would be optional in those implementations. For example, TCP/IP could always be used as an alternative, and the real time protocol (RTP) is one of several other possible protocol supplements for UDP/IP.

Once decoder 260 receives the secure voice frame at secure voice frame device 265, decoder 260 disassembles the secure voice frame according to disassemble secure voice frame device 270. In one embodiment, disassembly of the secure voice frame involves removal of the sequence number and frame check sequence. If padding was used for transmission, then the padding is also removed from the secure voice frame. Following this disassembly of the secure voice frame, decoder 260 then decrypts the ciphertext voice frame using decryption device 275. As in encoder 210, in one embodiment, decryption device 275 may include either a hardware implementation or a software implementation. Following decryption of the ciphertext voice frame, decoder 260 then deconstructs the voice frame according to deconstruct voice frame device 280. The deconstruction of the voice frame includes voice decoder 285. According to one embodiment, voice decoder 285 utilizes MELP coding to decompress the compressed digital information into uncompressed digital information. Following the decompression, decoder 260 finally converts the digital information into an analog signal with digital-to-analog converter 290. Once the digital information is converted into an analog signal, decoder 260 may then output the voice output to voice destination 150.

Notably, FIG. 2 depicts a secure voice over Internet protocol encoder and a secure voice over Internet protocol decoder system, both of which operate over an Internet 250. Further, as stated above, one embodiment of these systems includes an implementation that takes place on a standard personal computer over a network. Yet, these systems may also operate via a traditional public-switch telephone network.

Figure 3:
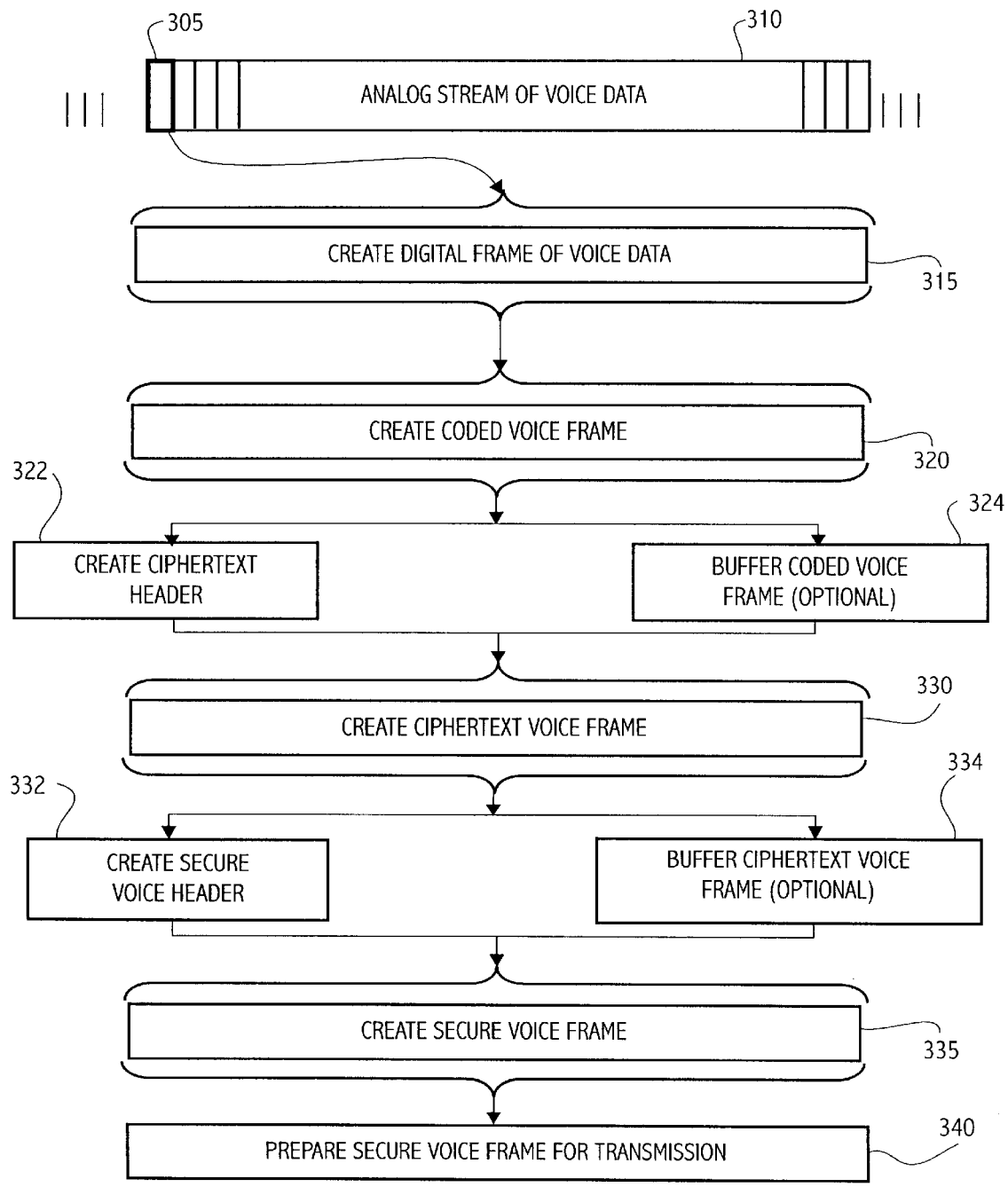
FIG. 3 is a flow chart of the operations of a secure voice over Internet protocol encoding system in accordance with one embodiment of the invention.

FIG. 3 is a flow chart of the operations of a secure voice over Internet protocol encoding system in accordance with one embodiment of the invention. FIG. 3 depicts how analog voice data is taken from a voice transmission and converted to a secure voice frame for transmission according to an embodiment of the invention. As shown in FIG. 3, a block of voice information 305 is taken from an analog stream of voice data 310 for encoding. During encoding, such as during the process for the system in encoder 210 of FIG. 2, analog voice information is converted into digital information, i.e., a digital frame of voice data. Create digital frame of voice data 315 corresponds to the operation of analog-to-digital converter 215 in FIG. 2. Next, digital frame of voice data 315 is converted into a coded voice frame. Create coded voice frame 320 corresponds to the operations of voice coder 220 and construct voice frame device 225 in FIG. 2. Create coded voice frame 320 includes both compression of the digital information and placement of that digital information into a frame, yielding a coded voice frame. Next, the coded voice frame is encrypted to create a ciphertext voice frame. As shown in FIG. 3, create ciphertext header 322 is used to add a header to the coded voice frame to create the ciphertext voice frame. Create ciphertext header 322 may optionally occur while the coded voice frame is placed in buffer coded voice frame 324. Create ciphertext voice frame 330 corresponds to the operation of encryption device 230 in FIG. 2. Next, the ciphertext voice frame is converted into a secure voice frame. As shown in FIG. 3, create secure voice header 332 is used to add another header to the ciphertext voice frame to create the secure voice frame. Create secure voice header 332 may optionally occur while the ciphertext voice frame is placed in buffer ciphertext voice frame 334. Create secure voice frame 335 corresponds to the operation of assemble secure voice frame device 235 in FIG. 2. Next, the secure voice frame is prepared for transmission. As described above, in one embodiment, a secure voice frame is prepared for transmission by adding padding to the secure voice frame. Prepare secure voice frame for transmission 340 corresponds to the operation of transmit secure voice frame device 240 in FIG. 2.

C. Illustration of Framing

Figure 4:
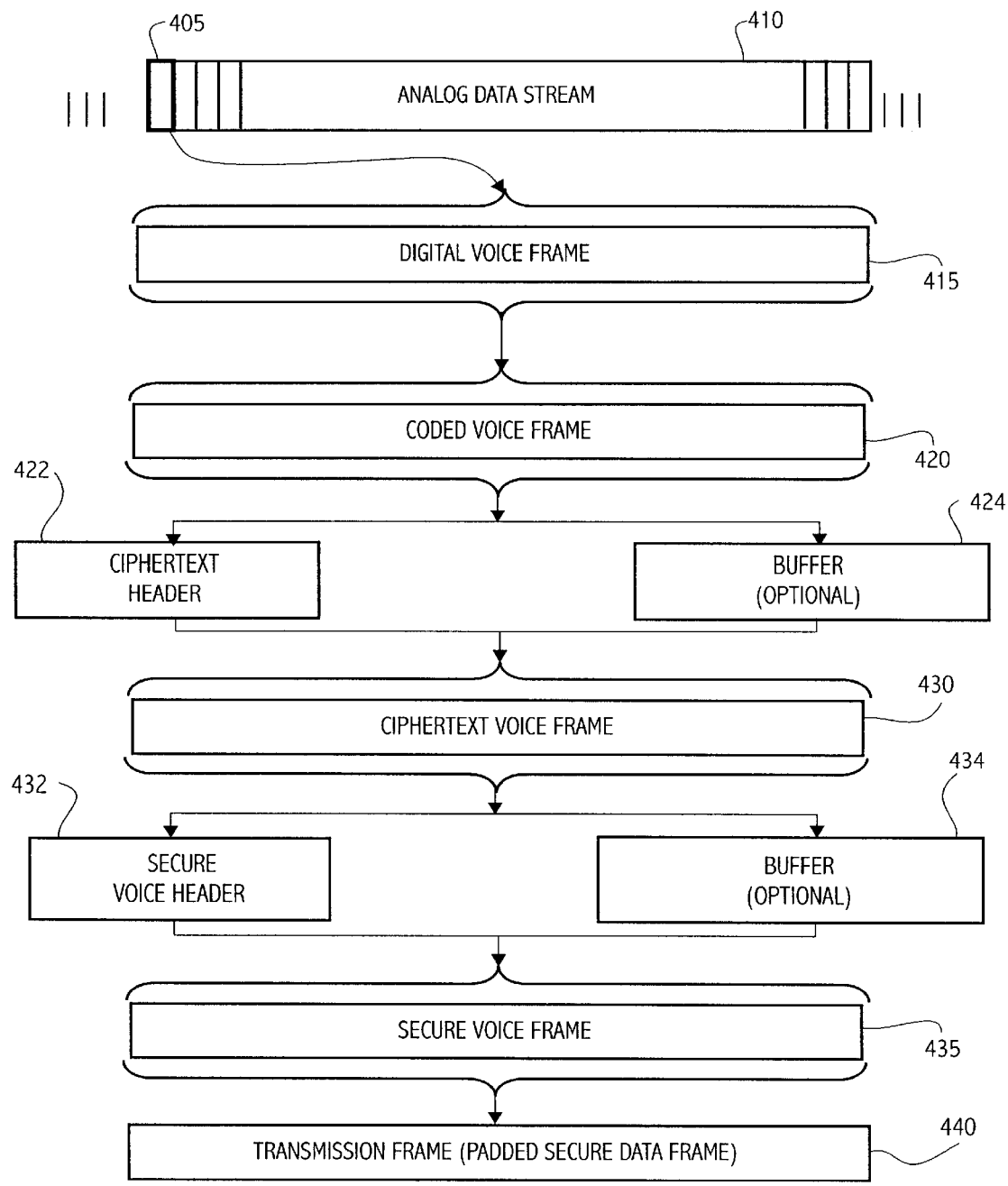
FIG. 4 is a flow chart of the operations of a framing scheme in accordance with the embodiment of the invention.

FIG. 4 is a flow chart of the operations of a framing scheme in accordance with the embodiment of the invention. However, FIG. 4 illustrates only one of many possible framing schemes according to this embodiment. According to this scheme, a block of data 405 is taken from an analog data stream 410 by sampling the analog speech and preparing samples, or blocks of data. According to the process and system described above in FIG. 3, a block of data 405 is then converted into a digital voice frame 415. Next, digital voice frame 415 is converted into a coded voice frame 420. A ciphertext voice frame 430 is then created by the addition of a ciphertext header 422. The creation of ciphertext voice frame 430 may optionally include buffer 424, which may hold coded voice frame 420 during the creation of ciphertext header 422. Next, a secure voice frame 435 is created by the addition of a secure voice header 432 to ciphertext voice frame 430. The creation of secure voice frame 434 may optionally include buffer 434, which holds ciphertext voice frame 430 during the creation of secure voice header 432. Finally, secure voice frame 435 is prepared for transmission as a transmission frame 440. Transmission frame 440 includes the addition of padding to secure voice frame 435, which results in the creation of transmission frame 440.

Figure 5:
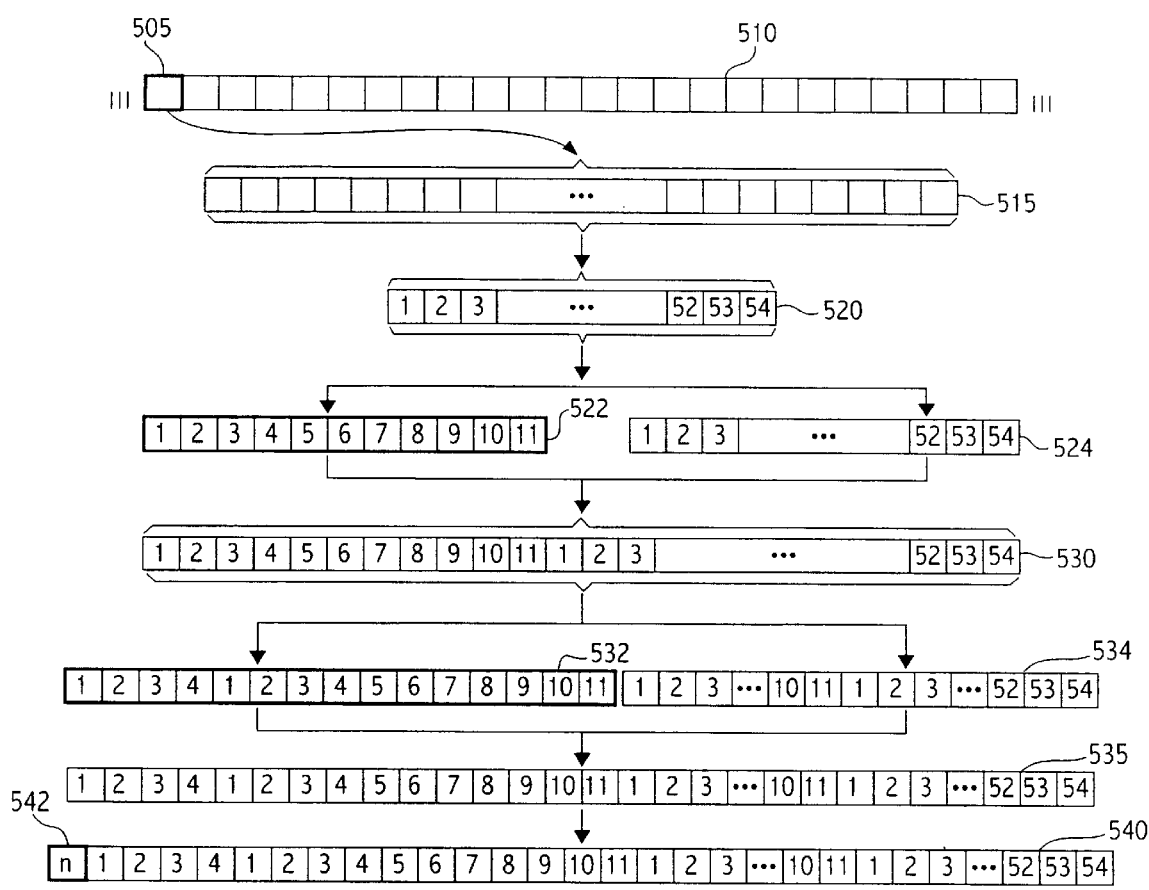
FIG. 5 is a block diagram of a framing scheme in accordance with the embodiment of the invention.

FIG. 5 is a block diagram used to explain the technique described above in connection with FIG. 4. However, FIG. 5 illustrates only one of many possible ways of framing a secure voice frame. Indeed, other framing implementations (and other header arrangements) would be compatible with systems consistent with the invention. The framing example in FIG. 5, however, presents one of the more efficient framing implementations.

According the framing example in FIG. 5, a block of data 505 is taken from an analog data stream 510 for conversion into a digital voice frame. Block of data 505 contains a sample of an analog signal from analog data stream 510. Digital voice frame 515 contains a frame of digital information, following conversion of the analog signal from block of data 505 into digital information. Digital voice frame 515 comprises an unspecified number of bits, as digital voice frame 515 simply represents the conversion of an analog signal into a digital format. Coded voice frame 520 comprises a frame of coded voice information, following conversion of digital voice frame 515 to a coded voice frame. In one embodiment, using MELP, coded voice frame 520 consists of 54 bits of information, representing 22.5 milliseconds of actual speech. Following the creation of coded voice frame 520, a ciphertext header 522 is created, which will be appended to coded voice frame 520. In one embodiment, using SKIPJACK, ciphertext header 522 comprises 11 bits. In this embodiment, the 11-bit ciphertext header consists of a frame sequence counter. Notably, coded voice frame 520 may optionally be held in buffer 524, pending creation of ciphertext header 522. Thus, coded voice frame 520 in buffer 524 may be joined with ciphertext header 522 to create ciphertext voice frame 530.

Following creation of ciphertext voice frame 530, secure voice header 532 is created, which will be appended to ciphertext voice frame 530. In one embodiment, secure voice header 532 comprises 15 bits. In this embodiment, 11 of the 15 bits represent a frame sequence number and 4 of the 15 bits represent a check sum. Notably, ciphertext voice frame 530 may optionally be held in buffer 534, pending creation of secure voice header 532. Thus, ciphertext voice frame 530 in buffer 534 may be joined with secure voice header 532 to create secure voice frame 535.

Following creation of secure voice frame 535, transmission frame 540 may be created. Transmission frame 540 contains some form of padding. In one embodiment, transmission frame 540 contains a 1-bit pad. Accordingly, as shown in FIG. 5, transmission frame 540 comprises secure voice frame 535 plus padding 542.

Figure 6:
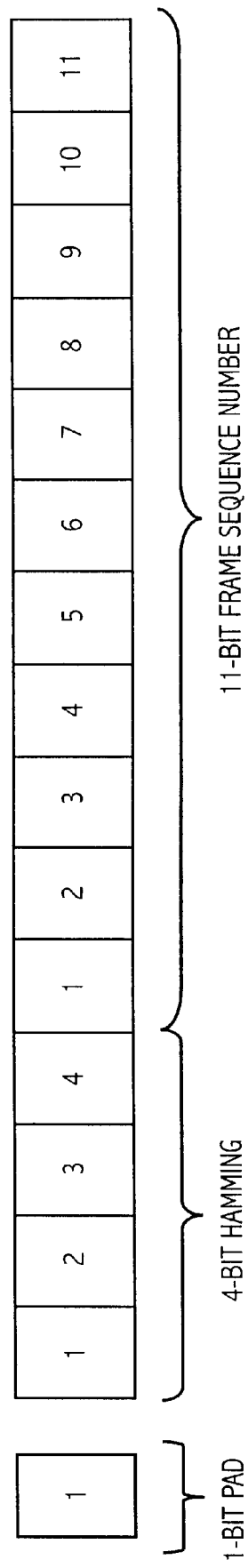
FIG. 6 is an illustration of a secure voice frame, in accordance with one embodiment of the present invention.

FIG. 6 is an illustration of a secure voice header with padding, in accordance with one embodiment of the present invention. In FIG. 5, transmission frame 540 depicts a preferred embodiment of a transmission frame. As also shown in FIG. 5, transmission frame 540 comprises a 54-bit coded voice frame 520, an 11-bit ciphertext header 522, a 15-bit secure voice header 532, and a 1-bit padding 542. FIG. 6 specifically illustrates secure voice header 532 and padding 542. As shown in FIG. 6, secure voice header 632 is a 15-bit header, comprising a frame sequence number and a check sum. In one embodiment, as in FIG. 6, the frame sequence number is the 11-bit ciphertext header. Also in this embodiment, the 4-bit check sum is created by 4-bit Hamming encoding, using Hamming encoding on the 11-bit frame sequence number. Also as shown in FIG. 6, padding 642 includes padding that is added to secure voice header 632. In one embodiment, as in FIG. 6, padding 642 is a 1-bit pad, which ensures octet-adjustment. In one implementation, the padding is a reserved bit and is set to 0. As shown in FIG. 6, the padding is the most significant bit of the transmission frame.

CONCLUSION

Systems consistent with the present invention overcome the disadvantages of the traditional mechanisms for processing secure voice communications over a network. Specifically, by combining voice coding with encryption as described above, the systems of the invention as disclosed herein provide for secure voice communications over a network, which overcome the shortcomings of the present systems and methods. Secure voice communications as disclosed herein occur using systems that conform to federal standards for voice coding and cryptography, applicable for both commercial and governmental applications (including unclassified governmental applications). For commercial applications, one embodiment of such systems may entail software-implemented cryptography. For governmental applications, such as classified governmental applications, another embodiment of such systems may entail hardware-implemented encryption. Other embodiments are also possible, such as, for example, mixed software- and hardware-implemented voice coding and/or encryption. Significantly, at least one embodiment of these systems would be compatible with narrowband and other limited-bandwidth connections.

As described above, therefore, it will be apparent to those skilled in the art that various modifications and variations can be made in the methods and apparatus of the present invention without departing from the spirit and scope of the invention. Thus, it is intended that the present invention cover the modifications and variations of this invention, provided they come within the scope of the appended claims and their equivalents. In this context, equivalents mean each and every implementation for carrying out the functions recited in the claims, even if not explicitly described herein.

What is claimed is:

1. A process for transmitting and receiving speech, comprising the steps of:

receiving an analog signal representing speech;

converting the analog signal into digital information;

translating the digital information into a data frame using a linear prediction technique;

storing the data frame in a first transmitter buffer;

encrypting the data frame into a ciphertext frame using a codebook encryption algorithm;

storing the ciphertext frame in a second transmitter buffer;

forming a secure voice frame from the ciphertext frame;

transmitting the secure voice frame over a network;

receiving the secure voice frame over a network;

removing the header from the secure voice frame to obtain the ciphertext frame;

storing the ciphertext frame in a first receiver buffer;

decrypting the ciphertext frame into a data frame using a codebook decryption algorithm;

storing the data frame in a second receiver buffer;

translating the data frame into digital information using a linear prediction technique;

converting the digital information into an analog signal representing speech; and outputting the speech, wherein the ciphertext frame in the encrypting step includes an eleven-bit frame sequence counter.

2. A process for transmitting and receiving speech, comprising the steps of:

receiving an analog signal representing speech;
converting the analog signal into digital information;
translating the digital information into a data frame using a linear prediction technique;
storing the data frame in a first transmitter buffer;
encrypting the data frame into a ciphertext frame using a codebook encryption algorithm;
storing the ciphertext frame in a second transmitter buffer;
forming a secure voice frame from the ciphertext frame;
transmitting the secure voice frame over a network;
receiving the secure voice frame over a network;
removing the header from the secure voice frame to obtain the ciphertext frame;
storing the ciphertext frame in a first receiver buffer;
decrypting the ciphertext frame into a data frame using a codebook decryption algorithm;
storing the data frame in a second receiver buffer;
translating the data frame into digital information using a linear prediction technique;
converting the digital information into an analog signal representing speech; and outputting the speech, wherein the ciphertext frame in the encrypting step includes an eleven-bit formed sequence of circuitry and further comprising using hamming encoding to increase the eleven-bit sequence counter to a fifteen-bit frame sequence counter to form the ciphertext frame.

3. A process for transmitting and receiving speech, comprising the steps of:

receiving an analog signal representing speech;
converting the analog signal into digital information;
translating the digital information into a data frame using a linear prediction technique;
storing the data frame in a first transmitter buffer;
encrypting the data frame into a ciphertext frame using a codebook encryption algorithm;
storing the ciphertext frame in a second transmitter buffer;
forming a secure voice frame from the ciphertext frame;
transmitting the secure voice frame over a network;
receiving the secure voice frame over a network;
removing the header from the secure voice frame to obtain the ciphertext frame;
storing the ciphertext frame in a first receiver buffer;
decrypting the ciphertext frame into a data frame using a codebook decryption algorithm;
storing the data frame in a second receiver buffer;
translating the data frame into digital information using a linear prediction technique;
converting the digital information into an analog signal representing speech; and outputting the speech, wherein the ciphertext frame is the encryptic step includes an eleven-bit form sequence counter and further comprising using hamming encoding to increase the elevator bit sequence counter to a fifteen-bit frame sequence counter to form the ciphertext frame and, further comprising appending a one-bit pad to the fifteen-bit hamming encoded frame sequence counter to form the ciphertext frame.

4. A process for transmitting and receiving speech, comprising the steps of:

receiving an analog signal representing speech;
converting the analog signal into digital information;
translating the digital information into a data frame using a linear prediction technique;
storing the data frame in a first transmitter buffer;
encrypting the data frame into a ciphertext frame using a codebook encryption algorithm;
storing the ciphertext frame in a second transmitter buffer;
forming a secure voice frame from the ciphertext frame;
transmitting the secure voice frame over a network;
receiving the secure voice frame over a network;
removing the header from the secure voice frame to obtain the ciphertext frame;
storing the ciphertext frame in a first receiver buffer;
decrypting the ciphertext frame into a data frame using a codebook decryption algorithm;
storing the data frame in a second receiver buffer;
translating the data frame into digital information using a linear prediction technique;
converting the digital information into an analog signal representing speech; and outputting the speech, wherein the ciphertext frame in the decryption step includes an eleven-bit frame sequence counter.

5. A process for transmitting and receiving speech, comprising the steps of:

receiving an analog signal representing speech;
converting the analog signal into digital information;
translating the digital information into a data frame using a linear prediction technique;
storing the data frame in a first transmitter buffer;
encrypting the data frame into a ciphertext frame using a codebook encryption algorithm;
storing the ciphertext frame in a second transmitter buffer;
forming a secure voice frame from the ciphertext frame;
transmitting the secure voice frame over a network;
receiving the secure voice frame over a network;
removing the header from the secure voice frame to obtain the ciphertext frame;
storing the ciphertext frame in a first receiver buffer;
decrypting the ciphertext frame into a data frame using a codebook decryption algorithm;
storing the data frame in a second receiver buffer;
translating the data frame into digital information using a linear prediction technique;
converting the digital information into an analog signal representing speech; and outputting the speech wherein the ciphertext frame is the encryptic step includes an eleven-bit form sequence counter and further comprising using hamming encoding to increase the eleven-bit sequence counter to a fifteen-bit frame sequence counter to form the ciphertext frame.

6. A process for transmitting and receiving speech, comprising the steps of:

receiving an analog signal representing speech;
converting the analog signal into digital information;
translating the digital information into a data frame using a linear prediction technique;

storing the data frame in a first transmitter buffer;
encrypting the data frame into a ciphertext frame using a codebook encryption algorithm;
storing the ciphertext frame in a second transmitter buffer;
forming a secure voice frame from the ciphertext frame;
transmitting the secure voice frame over a network;
receiving the secure voice frame over a network;
removing the header from the secure voice frame to obtain the ciphertext frame;
storing the ciphertext frame in a first receiver buffer;
decrypting the ciphertext frame into a data frame using a codebook decryption algorithm;
storing the data frame in a second receiver buffer;
translating the data frame into digital information using a linear prediction technique;
converting the digital information into an analog signal representing speech; and outputting the speech wherein the ciphertext frame is the decryption step includes an eleven-bit form sequence counter and further comprising using hamming encoding to increase the eleven-bit sequence counter to a fifteen-bit frame sequence counter to form the ciphertext frame and further comprising appending a one-bit pad to the fifteen-bit hamming encoded frame sequence counter to form the ciphertext frame.

7. A process for transmitting and receiving speech, comprising the steps of:
receiving an analog signal representing speech;
converting the analog signal into digital information;
translating the digital information into a data frame using a linear prediction technique;
storing the data frame in a first transmitter buffer;
encrypting the data frame into a ciphertext frame using a codebook encryption algorithm;
storing the ciphertext frame in a second transmitter buffer;
forming a secure voice frame from the ciphertext frame;
transmitting the secure voice frame over a network;
receiving the secure voice frame over a network;
removing the header from the secure voice frame to obtain the ciphertext frame;
storing the ciphertext frame in a first receiver buffer;
decrypting the ciphertext frame into a data frame using a codebook decryption algorithm;
storing the data frame in a second receiver buffer;
translating the data frame into digital information using a linear prediction technique;
converting the digital information into an analog signal representing speech; and outputting the speech, wherein the adding step forms an 80-bit secure voice frame.

8. A system for transmitting and receiving speech, comprising:
a first receiving component configured to receive an analog signal representing speech;
a first converting component configured to convert the analog signal into digital information;
a first translating component configured to translate the digital information into a data frame using a linear prediction technique;
a first transmitter buffer storing component configured to store the data frame in a first transmitter buffer;
an encrypting component configured to encrypt the data frame into a ciphertext frame using a codebook encryption algorithm;
a second transmitter buffer storing component configured to store the ciphertext frame in a second transmitter buffer;
a forming component configured to form a secure voice frame from the ciphertext frame;
a transmitting component configured to transmit the secure voice frame over a network;
a second receiving component configured to receive the secure voice frame over a network;
a removing component configured to remove the header from the secure voice frame to obtain the ciphertext frame;
a first receiver buffer storing component configured to store the ciphertext frame in a first receiver buffer;
a decrypting component configured to decrypt the ciphertext frame into a data frame using a codebook decryption algorithm;
a second receiver buffer storing component configured to store the data frame in a second receiver buffer;
a second translating component configured to translate the data frame into digital information using a linear prediction technique;
a second converting component configured to convert the digital information into an analog signal representing speech; and
an outputting component configured to output the speech, wherein the ciphertext frame in the encrypting component includes an eleven-bit frame sequence counter.

9. A system for transmitting and receiving speech, comprising:
a first receiving component configured to receive an analog signal representing speech;
a first converting component configured to convert the analog signal into digital information;
a first translating component configured to translate the digital information into a data frame using a linear prediction technique;
a first transmitter buffer storing component configured to store the data frame in a first transmitter buffer;
an encrypting component configured to encrypt the data frame into a ciphertext frame using a codebook encryption algorithm;
a second transmitter buffer storing component configured to store the ciphertext frame in a second transmitter buffer;
a forming component configured to form a secure voice frame from the ciphertext frame;
a transmitting component configured to transmit the secure voice frame over a network;
a second receiving component configured to receive the secure voice frame over a network;
a removing component configured to remove the header from the secure voice frame to obtain the ciphertext frame;
a first receiver buffer storing component configured to store the ciphertext frame in a first receiver buffer;
a decrypting component configured to decrypt the ciphertext frame into a data frame using a codebook decryption algorithm;
a second receiver buffer storing component configured to store the data frame in a second receiver buffer;

a second translating component configured to translate the data frame into digital information using a linear prediction technique;

a second converting component configured to convert the digital information into an analog signal representing speech; and an outputting component configured to output the speech, wherein the ciphertext frame in the encrypting component includes an eleven-bit frame sequence counter further comprising a using component configured to use hamming encoding to increase the eleven-bit sequence counter to a fifteen-bit frame sequence counter to form the ciphertext frame.

10. A system for transmitting and receiving speech, comprising:

a first receiving component configured to receive an analog signal representing speech;

a first converting component configured to convert the analog signal into digital information;

a first translating component configured to translate the digital information into a data frame using a linear prediction technique;

a first transmitter buffer storing component configured to store the data frame in a first transmitter buffer;

an encrypting component configured to encrypt the data frame into a ciphertext frame using a codebook encryption algorithm;

second transmitter buffer storing component configured to store the ciphertext frame in a second transmitter buffer;

a forming component configured to form a secure voice frame from the ciphertext frame;

a transmitting component configured to transmit the secure voice frame over a network;

a second receiving component configured to receive the secure voice frame over a network;

a removing component configured to remove the header from the secure voice frame to obtain the ciphertext frame;

a first receiver buffer storing component configured to store the ciphertext frame in a first receiver buffer;

a decrypting component configured to decrypt the ciphertext frame into a data frame using a codebook decryption algorithm;

a second receiver buffer storing component configured to store the data frame in a second receiver buffer;

a second translating component configured to translate the data frame into digital information using a linear prediction technique;

a second converting component configured to convert the digital information into an analog signal representing speech; and an outputting component configured to output the speech, wherein the ciphertext frame in the encrypting component includes an eleven-bit frame sequence counter, further comprising a using component configured to use hamming encoding to increase the eleven-bit sequence counter to a fifteen-bit frame sequence counter to form the ciphertext frame, further comprising an appending component configured to append a one-bit pad to the fifteen-bit hamming encoded frame sequence counter to form the ciphertext frame.

11. A system for transmitting and receiving speech, comprising:

a first receiving component configured to receive an analog signal representing speech;

a first converting component configured to convert the analog signal into digital information;

a first translating component configured to translate the digital information into a data frame using a linear prediction technique;

a first transmitter buffer storing component configured to store the data frame in a first transmitter buffer;

an encrypting component configured to encrypt the data frame into a ciphertext frame using a codebook encryption algorithm;

a second transmitter buffer storing component configured to store the ciphertext frame in a second transmitter buffer;

a forming component configured to form a secure voice frame from the ciphertext frame;

a transmitting component configured to transmit the secure voice frame over a network;

a second receiving component configured to receive the secure voice frame over a network;

a removing component configured to remove the header from the secure voice frame to obtain the ciphertext frame;

a first receiver buffer storing component configured to store the ciphertext frame in a first receiver buffer;

a decrypting component configured to decrypt the ciphertext frame into a data frame using a codebook decryption algorithm;

a second receiver buffer storing component configured to store the data frame in a second receiver buffer;

a second translating component configured to translate the data frame into digital information using a linear prediction technique;

a second converting component configured to convert the digital information into an analog signal representing speech; and an outputting component configured to output the speech, wherein the ciphertext frame in the decryption component includes an eleven-bit frame sequence counter.

12. A system for transmitting and receiving speech, comprising:

a first receiving component configured to receive an analog signal representing speech;

a first converting component configured to convert the analog signal into digital information;

a first translating component configured to translate the digital information into a data frame using a linear prediction technique;

a first transmitter buffer storing component configured to store the data frame in a first transmitter buffer;

an encrypting component configured to encrypt the data frame into a ciphertext frame using a codebook encryption algorithm;

a second transmitter buffer storing component configured to store the ciphertext frame in a second transmitter buffer;

a forming component configured to form a secure voice frame from the ciphertext frame;

a transmitting component configured to transmit the secure voice frame over a network;

a second receiving component configured to receive the secure voice frame over a network;

a removing component configured to remove the header from the secure voice frame to obtain the ciphertext frame;

a first receiver buffer storing component configured to store the ciphertext frame in a first receiver buffer;

a decrypting component configured to decrypt the ciphertext frame into a data frame using a codebook decryption algorithm;

a second receiver buffer storing component configured to store the data frame in a second receiver buffer;

a second translating component configured to translate the data frame into digital information using a linear prediction technique;

a second converting component configured to convert the digital information into an analog signal representing speech; and an outputting component configured to output the speech, wherein the ciphertext frame in the decryption component includes an eleven-bit frame sequence counter further comprising a using component configured to use hamming encoding to increase the eleven-bit sequence counter to a fifteen-bit frame sequence counter to form the ciphertext frame.

13. A system for transmitting and receiving speech, comprising:

a first receiving component configured to receive an analog signal representing speech;

a first converting component configured to convert the analog signal into digital information;

a first translating component configured to translate the digital information into a data frame using a linear prediction technique;

a first transmitter buffer storing component configured to store the data frame in a first transmitter buffer;

an encrypting component configured to encrypt the data frame into a ciphertext frame using a codebook encryption algorithm;

a second transmitter buffer storing component configured to store the ciphertext frame in a second transmitter buffer;

a forming component configured to form a secure voice frame from the ciphertext frame;

a transmitting component configured to transmit the secure voice frame over a network;

a second receiving component configured to receive the secure voice frame over a network;

a removing component configured to remove the header from the secure voice frame to obtain the ciphertext frame;

a first receiver buffer storing component configured to store the ciphertext frame in a first receiver buffer;

a decrypting component configured to decrypt the ciphertext frame into a data frame using a codebook decryption algorithm;

a second receiver buffer storing component configured to store the data frame in a second receiver buffer;

a second translating component configured to translate the data frame into digital information using a linear prediction technique;

a second converting component configured to convert the digital information into an analog signal representing speech; wherein the ciphertext frame in the decryption component includes an eleven-bit frame sequence counter, further comprising a using component configured to use hamming encoding to increase the eleven-bit sequence counter to a fifteen-bit frame sequence counter to form the ciphertext frame and further comprising an appending component configured to append a one-bit pad to the fifteen-bit hamming encoded frame sequence counter to form the ciphertext frame.

14. A system for transmitting and receiving speech, comprising:

a first receiving component configured to receive an analog signal representing speech;

a first converting component configured to convert the analog signal into digital information;

a first translating component configured to translate the digital information into a data frame using a linear prediction technique;

a first transmitter buffer storing component configured to store the data frame in a first transmitter buffer;

an encrypting component configured to encrypt the data frame into a ciphertext frame using a codebook encryption algorithm;

a second transmitter buffer storing component configured to store the ciphertext frame in a second transmitter buffer;

forming component configured to form a secure voice frame from the ciphertext frame;

a transmitting component configured to transmit the secure voice frame over a network;

a second receiving component configured to receive the secure voice frame over a network;

a removing component configured to remove the header from the secure voice frame to obtain the ciphertext frame;

a first receiver buffer storing component configured to store the ciphertext frame in a first receiver buffer;

a decrypting component configured to decrypt the ciphertext frame into a data frame using a codebook decryption algorithm;

a second receiver buffer storing component configured to store the data frame in a second receiver buffer;

a second translating component configured to translate the data frame into digital information using a linear prediction technique;

a second converting component configured to convert the digital information into an analog signal representing speech; and an outputting component configured to output the speech wherein the adding component forms an 80-bit secure voice frame.

* * * * *

UNITED STATES PATENT AND TRADEMARK OFFICE
CERTIFICATE OF CORRECTION

PATENT NO. : 6,272,633 B1
DATED : August 7, 2001
INVENTOR(S) : Andrew Cameron Duke, Robert Michael Giramma, Ryan Charles Tomasetti It is certified that error appears in the above-identified patent and that said Letters Patent is hereby corrected as shown below:

Column 16,
Line 34, before the words "forming component" insert -- a --

Signed and Sealed this

Fifteenth Day of January, 2002

Attest:

JAMES E. ROGAN
Director of the United States Patent and Trademark Office

Attesting Officer